(12) United States Patent
Dowd

(10) Patent No.: US 7,805,046 B2
(45) Date of Patent: Sep. 28, 2010

(54) TERMINATION OF FIBER OPTIC CABLE

(75) Inventor: Edward M. Dowd, Madison, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/145,592

(22) Filed: Jun. 25, 2008

(65) Prior Publication Data

US 2009/0034920 A1 Feb. 5, 2009

Related U.S. Application Data

(60) Provisional application No. 60/948,409, filed on Jul. 6, 2007.

(51) Int. Cl.
*G02B 6/00* (2006.01)
*G02B 6/44* (2006.01)

(52) U.S. Cl. ...................................... 385/139; 382/100
(58) Field of Classification Search ........................ None
See application file for complete search history.

(56) References Cited

U.S. PATENT DOCUMENTS

| 5,125,063 | A | 6/1992 | Panuska et al. | |
|---|---|---|---|---|
| 6,253,012 | B1 | 6/2001 | Keller et al. | |
| 6,272,273 | B1 * | 8/2001 | Bookwalter et al. | 385/100 |
| 6,496,625 | B1 * | 12/2002 | Falkowich et al. | 385/100 |
| 6,898,354 | B2 * | 5/2005 | Kim et al. | 385/100 |
| 6,931,194 | B2 | 8/2005 | Dowd et al. | |
| 2005/0031277 | A1 | 2/2005 | Japon | |

FOREIGN PATENT DOCUMENTS

| EP | 0 434 212 | 6/1991 |
|---|---|---|
| GB | 2 409 053 | 6/2005 |
| JP | 2004-133210 | 4/2004 |

OTHER PUBLICATIONS

GB Search Report from Application No. GB0812246.7 dated Oct. 18, 2008.

* cited by examiner

*Primary Examiner*—Tina M Wong
(74) *Attorney, Agent, or Firm*—Patterson & Sheridan, LLP

(57) ABSTRACT

Apparatus and methods provide for cables with secured terminations. For some embodiments, a cable includes an inner tube surrounding an optical fiber, an aluminum tube surrounding the inner tube, and armor tubing surrounding the aluminum tube. The aluminum tube resists collapse of the inner tube at bends in the cable, inhibits or prevents hydrogen from reaching the fiber, and facilitates termination of the cable. For example, terminating the cable may include crimping the armor tubing to deform the aluminum tube into gripping engagement with an outside of the inner tube and an inside of the armor tubing. In some embodiments, a retention assembly secures the fiber relative to the inner tube and includes a retention tube secured to the inner tube and a packing sleeve squeezed into gripping engagement with the fiber by radial inward deformation of the retention tube where the packing sleeve is disposed in the retention tube.

14 Claims, 4 Drawing Sheets

TERMINATION OF FIBER OPTIC CABLE

CROSS-REFERENCE TO RELATED APPLICATIONS

This application claims benefit of U.S. provisional patent application Ser. No. 60/948,409, filed Jul. 6, 2007, which is herein incorporated by reference.

BACKGROUND OF THE INVENTION

1. Field of the Invention

Embodiments of the present invention generally relate to cables, such as those used in downhole operations.

2. Description of the Related Art

Cable represents a significant cost of downhole sensing systems. Cost drivers include materials, supplier yield issues, and associated testing costs. Delays in cable build cycle time lead to increases in time needed for delivery of the cable. Wasted cable also represents significant cost since there is often a significant amount of unused cable remnants (e.g., lengths less than 1500 meters) due to manufacturing defects.

Various such cost associated problems exist with prior cables, which may utilize a polymer buffer between armor tubing and an inner tubing carrying optical fibers. In addition, the polymer buffer can contribute to pinching of the inner tubing at bends in the cable and requires removal prior to welding onto the armor tubing. Termination of such cables requires complicated and time consuming procedures.

Therefore, there exists a need for an improved cable and cable termination.

SUMMARY OF THE INVENTION

In one embodiment, a method prepares a cable with a secured termination. The cable includes an inner tube having an optical fiber disposed inside the inner tube. The method includes removing a portion of an inner tube of the cable at an end of the cable to expose a length of the optical fiber extending from an end of the inner tube, positioning an elastomeric packing sleeve surrounding at least part of the length of the optical fiber adjacent the end of the inner tube, positioning a retention tube overlapping outsides of both the inner tube and the elastomeric packing sleeve, and securing the retention tube to the inner tube. In addition, deforming the retention tube in a radial inward direction where the packing sleeve is disposed in the retention tube squeezes the packing sleeve into gripping engagement with the optical fiber.

For one embodiment, a cable with a secured termination includes an optical fiber and an inner tube surrounding the optical fiber with a length of the optical fiber extending from an end of the inner tube. An elastomeric packing sleeve surrounds at least part of the length of the optical fiber adjacent the end of the inner tube. Further, a retention tube overlaps outsides of both the inner tube and the elastomeric packing sleeve, is secured to the inner tube, and is deformed in a radial inward direction where the packing sleeve is disposed in the retention tube to squeeze the packing sleeve into gripping engagement with the optical fiber.

According to one embodiment, a method of preparing a cable with a secured termination utilizes the cable that includes an inner tube having an optical fiber disposed inside the inner tube, an aluminum tube surrounding the inner tube and armor tubing surrounding the aluminum tube. Removing a portion of the armor tubing, the aluminum tube and the inner tube at an end of the cable exposes a length of the optical fiber extending from an end of the inner tube. Crimping a section of the armor tubing secures the armor tubing, the aluminum tube and the inner tube relative to one another. Securing the optical fiber relative to the inner tube occurs with a retention assembly coupled to the inner tube and at least part of the length of the optical fiber adjacent the end of the inner tube.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Apparatus and methods relate to cables that may have secured terminations. For some embodiments, a cable includes an inner tube surrounding an optical fiber, an aluminum tube surrounding the inner tube, and armor tubing surrounding the aluminum tube. The aluminum tube resists collapse of the inner tube at bends in the cable, inhibits or prevents hydrogen from reaching the fiber, and facilitates termination of the cable. For example, terminating the cable may include crimping the armor tubing to deform the aluminum tube into gripping engagement with an outside of the inner tube and an inside of the armor tubing. In some embodiments, a retention assembly secures the fiber relative to the inner tube and includes a retention tube secured to the inner tube and a packing sleeve squeezed into gripping engagement with the fiber by radial inward deformation of the retention tube where the packing sleeve is disposed in the retention tube.

Figure 1:
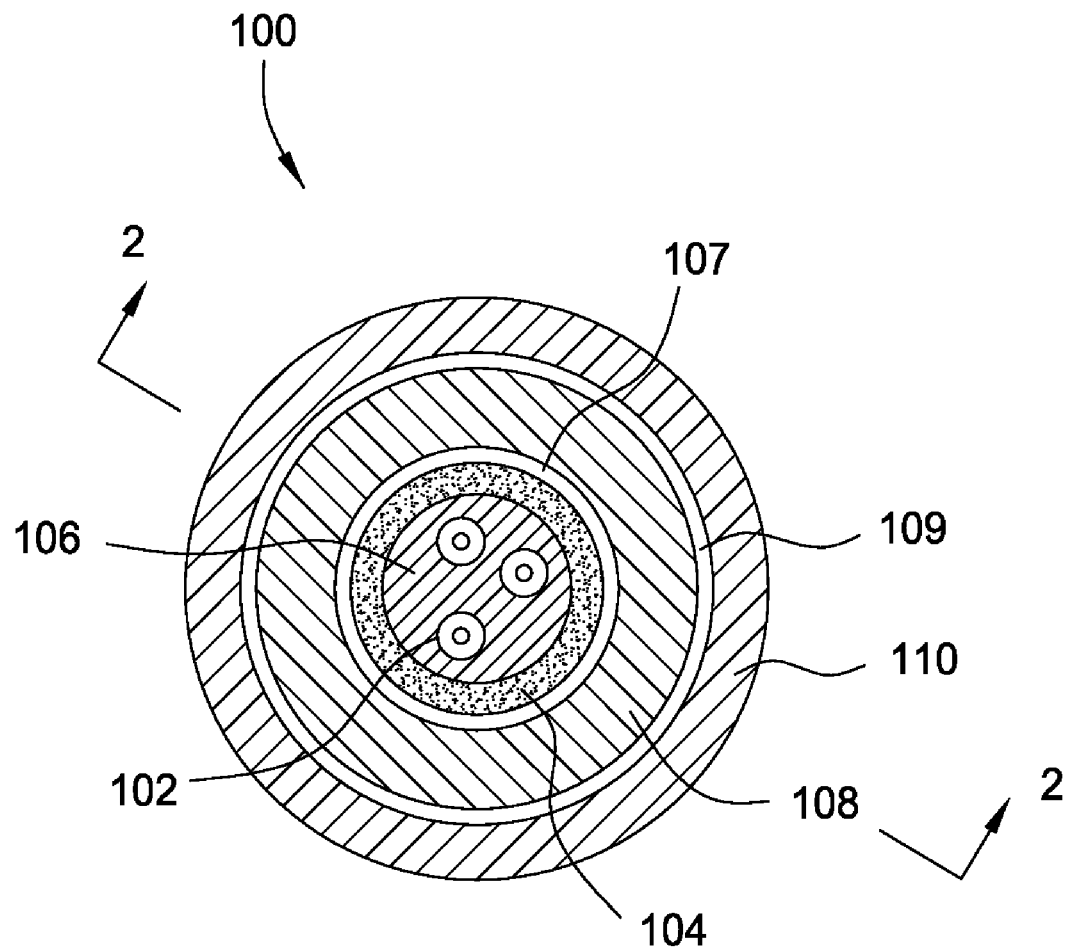
FIG. 1 is a cross-section view of a cable with an aluminum tube disposed between armor tubing and an inner tube surrounding one or more optical fibers, according to one embodiment.

FIG. 1 shows a cross-section view of a cable 100. The cable 100 includes three optical fibers 102 disposed inside an inner tube 104. While three are shown as an example, the inner tube 104 may contain any number of the optical fibers 102. In some embodiments, a filler material 106 is disposed in the inner tube 104 and substantially fills the void spaces within the inner tube 104 surrounding the optical fibers 102 to support and prevent the optical fibers 102 from moving excessively within the inner tube 104.

The filler material 106 has sufficient viscosity to resist the shear forces applied to it as a result of the weight of the optical fiber 102 when disposed in a vertical well installation at elevated temperatures, thereby supporting the optical fibers 102 without subjecting the fibers to the strain of their weight. The filler material 106 allows the optical fibers 102 to relax and straighten with respect to the inner tube 104 due to differences in the coefficients of thermal expansion between the optical fiber 102 and the inner tube 104 and during spooling, deployment and use of the cable 100. In addition, the filler material 106 also prevents chaffing of the coatings on the optical fibers 102 as a result of bending action during installation and vibration of the cable 100. The filler material 106 also serves as a cushion for the optical fiber 102 against the surface of the inner tube 104 to avoid microbend losses across cable bends. Suitable compounds for the filler material 106 include conventional thixotropic gels or grease compounds commonly used in the fiber optic cable industry for water blocking, filling and lubrication of optical fiber cables.

The cable 100 further includes an aluminum tube 108 disposed around the inner tube 104 and within armor tubing 110 of the cable 100. For some embodiments, outer jacketing, such as a polymeric coating, surrounds the armor tubing 110. The inner tube 104 and armor tubing 110 may be manufactured of the same material, such as a metal or metal alloy. Examples of suitable materials include corrosion resistant metal alloys such as 304 stainless steel, 316 stainless steel, INCONEL® 625 and INCOLOY® 825.

The aluminum tube 108 substantially fills an annular area between the inner tube 104 and the armor tubing 110. In some embodiments, an outer diameter of the inner tube 104 being about 0.1 to 0.3 mm smaller than an inner diameter of the aluminum tube 108 defines a first annular air gap 107 and an outer diameter of the aluminum tube 108 being about 0.1 to 0.3 mm smaller than an inner diameter of the armor tube 104 forms a second annular air gap 109. In some embodiments, aluminum or an aluminum alloy forms the aluminum tube 108, which may also be made of other metals or metal alloys that resist hydrogen diffusion and/or are more ductile than the inner tube 104 and armor tubing 110.

For some embodiments, manufacturing of the aluminum tube 108 by extrusion produces the aluminum tube 108 without any longitudinal seams or welds. When extruded, the material forming the aluminum tube 108 is heated and pushed through a die. This extrusion may occur over the inner tube 104. Compared to folding and welding to make the aluminum tube 108, the extrusion reduces costs and limits defects in the aluminum tube 108 that can be caused by skips or pin holes occurring with welds. Thickness selection for the aluminum tube 108 corresponds to level of hydrogen protection provided by the aluminum tube 108 that blocks hydrogen outside of the cable 100 from reaching the optical fibers 102.

The thickness of the aluminum tube 108 may provide equal or better hydrogen protection than that provided by tin plating on the inner tube 104 such that this plating process may not be required. The aluminum tube 108 also replaces polymer material disposed between the inner tube 104 and the armor tubing 110. Eliminating the plating and polymer material reduces costs and avoids other problems. For example, the inner tube 104 does not need to be shipped to a separate company and/or location for the plating that can require several days and cause breaks in length of the inner tube 104. Further, addition of the polymer material may occur at yet another company and/or location and also introduce yield problems.

The aluminum tube 108 further acts as a heat sink when desired to weld over the armor tubing 110 as may be required at terminations of the cable 100. The aluminum tube 108 thereby withstands heat caused by welding while protecting the optical fibers 102 from the heat. This heat sink aspect provides additional cost advantages compared to designs utilizing the polymeric material instead of the aluminum tube 108. For example, welding processes for use with the designs having the polymeric material require coring out of the polymeric material and replacing the polymeric material with a copper heat sink where welding is desired. The welding must then occur at this particular location in order to avoid cable damage.

To further reduce the effects of hydrogen on the optical fibers 102, the filler material 106 may optionally include or be impregnated with a hydrogen absorbing/scavenging material, such as palladium or tantalum. In one embodiment, the hydrogen absorbing/scavenging material is a vanadium-titanium wire coated with palladium. For some embodiments, the inner tube 104 may be coated and/or impregnated with a hydrogen absorbing/scavenging material.

Figure 2:
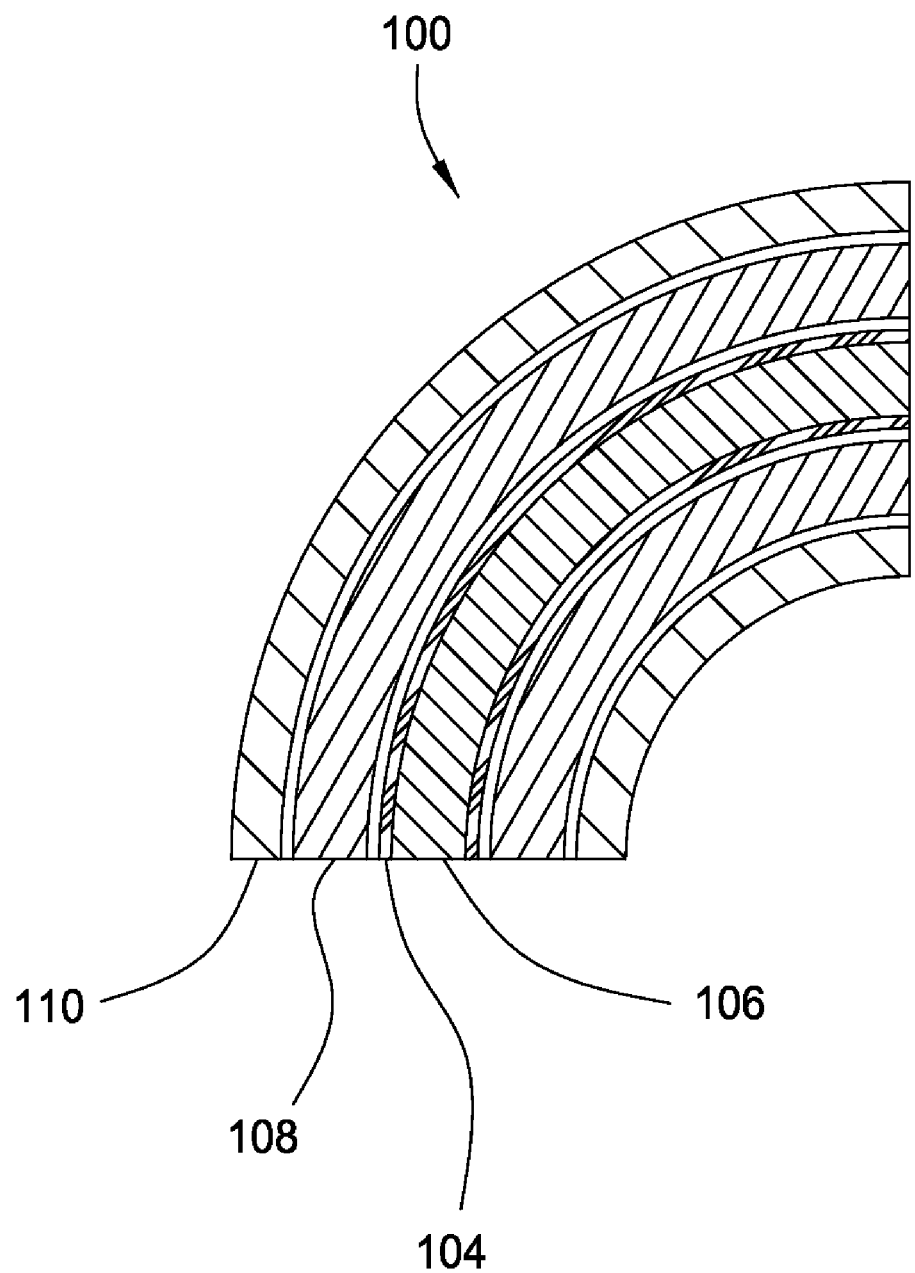
FIG. 2 is a cross-section view of the cable taken across line 2-2 in FIG. 1 and along a curved length of the cable, according to one embodiment.

FIG. 2 illustrates a cross-section view of the cable 100 taken across line 2-2 in FIG. 1 and along a curved length of the cable 100. The aluminum tube 108 keeps the inner tube 104 substantially centered within the armor tubing 110 so as to maintain a common length relationship between each when rolled onto a drum. Bending of the cable 100 by about ninety degrees often occurs at a tree flange or wellhead of a well. In such a bend, the aluminum tube 108 improves resistance to collapse of the inner tubing 104 compared to designs utilizing the polymeric material. By acting as a mechanical support structure, the aluminum tube 108 achieves a smooth bend transition without permitting breakage or stress damage to the optical fibers 102 due to collapse and kinking of the inner tube 104.

Figure 3:
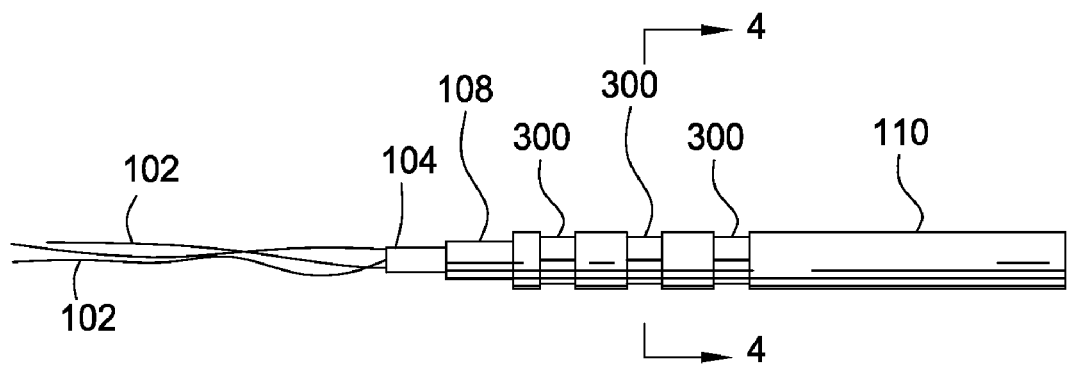
FIG. 3 is a view of an end of the cable depicting one stage of terminating of the cable with the inner tube, the aluminum tube and the armor tubing cut and the armor tubing having been crimped, according to one embodiment.

FIG. 3 shows an end of the cable 100 depicting one stage of terminating of the cable 100. Terminating the cable 100 permits repairing a damaged section of the cable 100, coupling the cable 100 to an optical sensor or surface equipment, or adding an additional cable length. However, shifting of components in the cable 100 relative to each other due to tensile loads or thermal expansion can damage the optical fibers 102 that extend from the end of the cable 100. Secured termination at the end of the cable 100 prevents such relative movement. In operation, preparing a termination for the cable 100 begins by cutting the armor tubing 110, the aluminum tube 108, and then the inner tube 104 and forming crimps 300 in the armor tubing 110.

With respect to the cutting, a portion of the armor tubing 110 is first removed from the end of the cable 100. The operator can use a standard tube cutter to score the outside of the armor tubing 110, which the operator can then file and/or flex at the score to cleave the portion of the armor tubing 110 being stripped. A sufficient length (e.g. fifty centimeters) of the armor tubing 110 is stripped from the end of the cable 100 in order to leave enough of the optical fibers 102 to form any desired couplings at free ends of the optical fibers 102. Next, a portion of the aluminum tube 108 is stripped from the cable 100. While a length of the aluminum tube 108 is shown extending past the armor tubing 110 to facilitate ease of cutting the aluminum tube 108, the aluminum tube 108 may be stripped such that the aluminum tube 108 and the armor tubing 110 are flush or coterminous. The operator can use the standard tube cutter to cut through most of the aluminum tube 108 prior to twisting and sliding off the end of the cable 100 the portion of the aluminum tubing 108 being stripped. Once the portion of the aluminum tube 108 is removed, the operator can score the inner tube 104 with a knife file and flex the inner tube 104 to cleave a portion of the inner tube 104 being stripped. The inner tube 104 is stripped such that a length (e.g. four millimeters) of the inner tube 104 extends past the aluminum tube 108.

Mechanical crimps 300 secure the inner tube 104 to the armor tubing 110 via the aluminum tube 108. In particular, the crimps 300 deform the aluminum tube 108 into gripping engagement with an outside surface of the inner tube 104 and an inside surface of the armor tubing 110. While roller crimping may be used to perform the crimping, this time consuming and more sensitive procedure may not be required. Thus, a crimping tool having die inserts can be used to provide the crimps 300. Depending on the shape of the die inserts of the crimping tool, the crimps 300 may be a hex crimp, a circular crimp, or any other shape. While three of the crimps 300 are shown positioned along the outside of the armor tubing 110, any number of the crimps 300 may be used in succession to create a stronger holding force between the inner tube 104 and the armor tubing 110.

Figure 4:
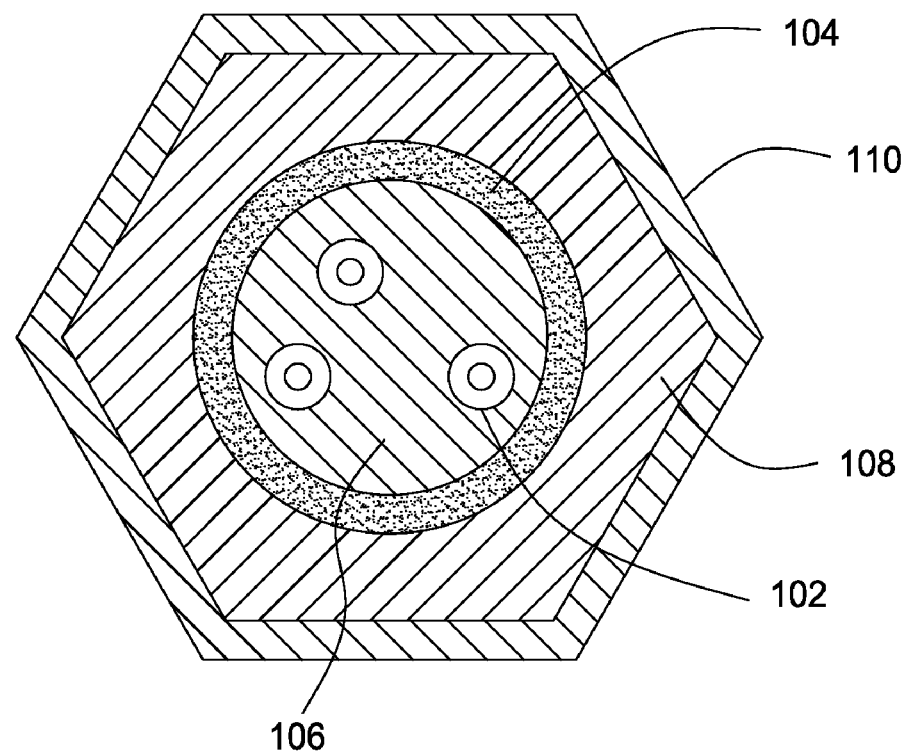
FIG. 4 is a cross-section view of the cable taken across line 4-4 in FIG. 3 showing deformation of the armor tubing and hence the aluminum tube where crimped, according to one embodiment.

FIG. 4 illustrates a cross-section view of the cable 100 taken across line 4-4 in FIG. 3 showing deformation of the armor tubing 110 and hence the aluminum tube 108 where crimped. Forming two of the crimps 300 simultaneously facilitates in filling in between the crimps 300 that are created at the same time with the material of the aluminum tube 108 to create a seal between the inner tube 104 and the armor tubing 110. For some embodiments, the die inserts of the crimping tool thus include one or more corresponding hollowed out mid-regions to enable forming the crimps 300 at spaced apart locations. Unlike one continuous crimp equivalent in size to a combined area of the crimps 300, the crimps 300 at multiples spaced locations gives the material of the aluminum tube 108 a place to be displaced. This spacing of the crimps 300 avoids creating excessive forces on the inner tube 104 that tend to crush the inner tube 104 given that displacement of the material of the aluminum tube 108 must otherwise go somewhere.

Figure 5:
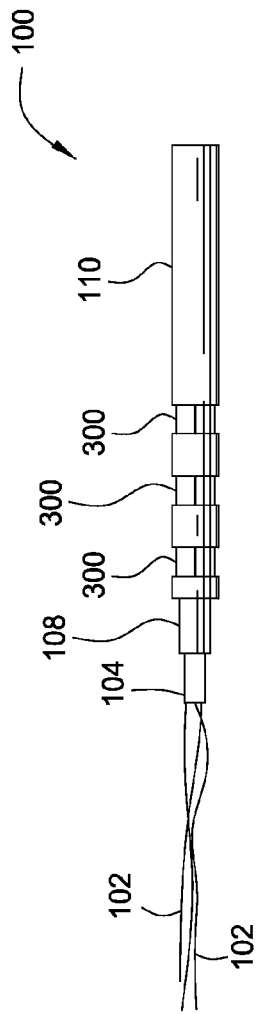
FIG. 5 is a view of the end of the cable showing sliding of one or more elastomeric sleeves over the one or more fibers in a succeeding stage of terminating of the cable, according to one embodiment.

FIG. 5 shows the end of the cable 100 in a succeeding stage of terminating of the cable 100. A first movement arrow 501 depicts sliding over the fibers 102 of a tubular protective insert 502 and a tubular body 500 that may both be coupled together prior to being positioned onto the cable 100. A second movement arrow 503 represents subsequent sliding of an optional elastomeric packing sleeve 504 over the fibers 102. For some embodiments, the body 500 is integrated with or otherwise serves the functions described herein with respect to the elastomeric packing sleeve 504.

In some embodiments, a portion of the protective insert 502 is disposed concentric within the body 500 while a remainder of the protective insert 502 extends beyond an end of the body 500. The protective insert 502 may, for example, be made of a polymer such as polyimide. For some embodiments, the body 500 is made of a polymer or elastomer such as silicone. In order to position the body 500 and the protective insert 502 on the end of the cable 100, the fibers 102 are run through inner bores of the protective tube 502 and the body 500. The portion of the protective insert 502 that extends beyond the body 500 inserts into the inner diameter of the inner tube 104. In this manner, the protective insert 502 protects the fibers 102 from any burrs on the end of the inner tube 104 along where the inner tube 104 was cut. As an outer diameter of the body 500 is greater than an outer diameter of the protective tube 502 and the inner diameter of the inner tube 104, the body 500 abuts against the cut end of the inner tube 104.

An elastomer material, such as silicone, forms the elastomeric packing sleeve 504 that is then positioned on the cable 100 against the body 500 by running the fibers 102 through an inner bore of the packing sleeve 504. The packing sleeve 504 can have a greater wall thickness and a smaller inner diameter than the body 500 given that the body 500 may be designed with an inner diameter sufficient to receive the protective insert 502. Since ability of the packing sleeve 504 to grip the fibers 102 as described further herein depends on these dimensional features, the packing sleeve 504, by being a separate component, can be dimensioned with ease and as desired independent of any criteria associated with the body 500.

Figure 6:
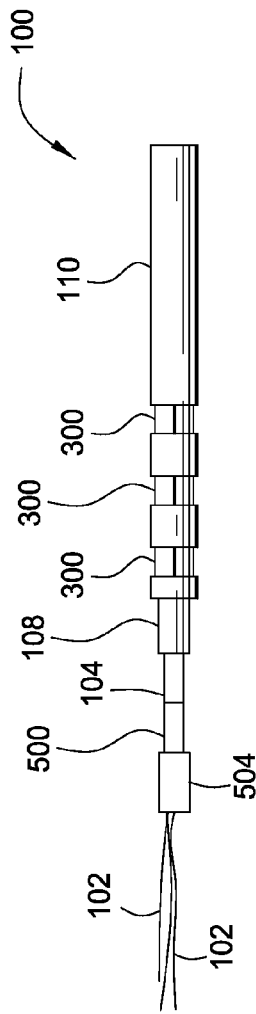
FIG. 6 is a view of the end of the cable illustrating a subsequent stage of terminating of the cable with the one or more elastomeric sleeves in place and sliding of a retention tube over the one or more elastomeric sleeves and the inner tube, according to one embodiment.

FIG. 6 illustrates the end of the cable 100 after the protective insert 502, body 500, and packing sleeve 504 have been positioned on the cable 100. In a subsequent stage of terminating of the cable 100, a third movement arrow 601 depicts sliding of a retention tube 600 onto the cable 100 to position the retention tube 600 over the packing sleeve 504 and the inner tube 104. A stainless steel or other metal or metal alloy may form the retention tube 600. The retention tube 600 may abut the aluminum tube 108 when located on the cable 100. For some embodiments, preassembly of two or more of the protective insert 502, body 500, packing sleeve 504 and retention tube 600 may occur prior to positioning of such a subassembly on the cable 100.

Figure 7:
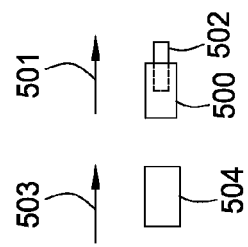
FIG. 7 is a view of the end of the cable once termination is completed with the retention tube crimped over the one or more elastomeric sleeves and crimped over the inner tube, according to one embodiment.
Figure 7:
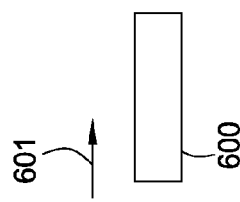

FIG. 7 shows the end of the cable 100 once termination is completed. A first crimp 700 made to the retention tube 600 and located where the packing sleeve 504 is disposed in the retention tube 600 connects the packing sleeve 504 and the retention tube 600 together. Further, the first crimp 700 deforms the retention tube 600 in a radial inward direction and hence squeezes the packing sleeve 504 around the fibers 102 such that the packing sleeve 504 grips the fibers 102 and/or seals against the fibers 102. A second crimp 701 connects the retention tube 600 to the inner tube 104 by crimping the retention tube 600 against the inner tube 104 located beneath the retention tube 600 at a location of the second crimp 701.

As a result of the termination, components of the cable 100 are prevented from moving relative to one another given thermal expansion effects and tensile or mechanical forces, such as bending and weight. The termination thereby holds all components of the cable 100 to avoid movement of the fibers 102 at, for example, splices. A force of 95 pounds may be put on the termination from the aluminum tube 108 when raising the temperature to 175° C. Therefore, cable termination tensile load specifications of 200 pounds hold the thermal expansion forces.

While the foregoing is directed to embodiments of the present invention, other and further embodiments of the invention may be devised without departing from the basic scope thereof, and the scope thereof is determined by the claims that follow.

What is claimed is:

1. A method of preparing a cable with a secured termination, comprising:
   providing the cable comprising an inner tube having an optical fiber disposed inside the inner tube;
   removing a portion of the inner tube at an end of the cable to expose a length of the optical fiber extending from an end of the inner tube;

positioning an elastomeric packing sleeve surrounding at least part of the length of the optical fiber adjacent the end of the inner tube;

positioning a retention tube overlapping outsides of both the inner tube and the elastomeric packing sleeve;

securing the retention tube to the inner tube; and deforming the retention tube in a radial inward direction where the packing sleeve is disposed in the retention tube to squeeze the packing sleeve into gripping engagement with the optical fiber.

2. The method of claim 1, wherein securing the retention tube to the inner tube includes crimping the retention tube against the outside of the inner tube.

3. The method of claim 1, further comprising crimping a section of armor tubing to secure the armor tubing, an aluminum tube and the inner tube relative to one another, wherein the cable further comprises the aluminum tube surrounding the inner tube and the armor tubing surrounding the aluminum tube.

4. The method of claim 1, wherein the elastomeric packing sleeve comprises silicone.

5. The method of claim 1, further comprising positioning a tubular protective insert into the end of the inner tube.

6. The method of claim 1, further comprising positioning a first end of a tubular protective insert into the end of the inner tube, wherein a second end of the insert is received in a body that is adjacent the end of the inner tube and has a larger outer diameter than the insert.

7. A cable with a secured termination, comprising:

an optical fiber;

an inner tube surrounding the optical fiber, wherein a length of the optical fiber extends from an end of the inner tube;

an elastomeric packing sleeve surrounding at least part of the length of the optical fiber adjacent the end of the inner tube; and a retention tube overlapping outsides of both the inner tube and the elastomeric packing sleeve, wherein the retention tube is secured to the inner tube and the retention tube is deformed in a radial inward direction where the packing sleeve is disposed in the retention tube to squeeze the packing sleeve into gripping engagement with the optical fiber.

8. The cable of claim 7, wherein the elastomeric packing sleeve comprises silicone.

9. The cable of claim 7, further comprising:

an aluminum tube surrounding the inner tube; and armor tubing surrounding the aluminum tube, wherein a section of the armor tubing is crimped to secure the armor tubing, the aluminum tube and the inner tube relative to one another.

10. The cable of claim 7, wherein the aluminum tube is formed of extruded material and is thereby seamless.

11. The cable of claim 7, wherein the retention tube is secured to the inner tube by a crimp in the retention tube that presses the retention tube against the outside of the inner tube.

12. The cable of claim 7, wherein the inner tube and the retention tube are both made of metallic material.

13. The cable of claim 7, further comprising:

a metal tube surrounding the inner tube; and armor tubing surrounding the metal tube and crimped to secure the armor tubing, the metal tube and the inner tube relative to one another, wherein the metal tube is made of a material more ductile than the inner tube and the armor tubing.

14. The cable of claim 7, further comprising:

a metal tube surrounding the inner tube; and armor tubing surrounding the metal tube and crimped to secure the armor tubing, the metal tube and the inner tube relative to one another, wherein the metal tube is made of a material more impermeable to hydrogen than the inner tube and the armor tubing.

* * * * *